US011286325B2

(12) United States Patent
Brandau et al.

(10) Patent No.: US 11,286,325 B2
(45) Date of Patent: Mar. 29, 2022

(54) NITRILE-DIENE-CARBOXYLIC ACID ESTER COPOLYMERS

(71) Applicant: ARLANXEO DEUTSCHLAND GMBH, Dormagen (DE)

(72) Inventors: Sven Brandau, Cologne (DE); Robert Stäber, Ebsdorfergrund (DE); Susanna Lieber, Kaiserslautern (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 93 days.

(21) Appl. No.: 16/955,988

(22) PCT Filed: Dec. 13, 2018

(86) PCT No.: PCT/EP2018/084755
§ 371 (c)(1),
(2) Date: Jun. 19, 2020

(87) PCT Pub. No.: WO2019/121321
PCT Pub. Date: Jun. 27, 2019

(65) Prior Publication Data
US 2021/0079145 A1 Mar. 18, 2021

(30) Foreign Application Priority Data
Dec. 21, 2017 (EP) .................................... 17290164

(51) Int. Cl.
*C08F 236/12* (2006.01)
*C08L 9/02* (2006.01)
*C08L 15/00* (2006.01)

(52) U.S. Cl.
CPC .............. *C08F 236/12* (2013.01); *C08L 9/02* (2013.01); *C08L 15/005* (2013.01)

(58) Field of Classification Search
CPC ................ C08F 236/12; C08F 220/286; C08F 2810/20; C08L 9/02; C08L 2312/00
See application file for complete search history.

(56) References Cited

U.S. PATENT DOCUMENTS

| | | |
|---|---|---|
| 3,700,637 A | 10/1972 | Finch, Jr. |
| 4,337,329 A | 6/1982 | Kubo et al. |
| 4,384,081 A | 5/1983 | Kubo et al. |
| 4,452,951 A | 1/1984 | Kubo et al. |
| 4,503,196 A | 3/1985 | Rempel et al. |
| 4,581,417 A | 4/1986 | Buding et al. |
| 9,650,452 B2 | 5/2017 | Brandau et al. |
| 10,494,467 B2 | 12/2019 | Obrecht et al. |
| 10,544,234 B2 | 1/2020 | Lieber et al. |
| 10,597,467 B2 | 3/2020 | Brandau et al. |
| 2013/0237667 A1 | 9/2013 | Brandau et al. |
| 2014/0114025 A1 | 4/2014 | Brandau et al. |
| 2016/0251454 A1 | 9/2016 | Lieber et al. |
| 2016/0257773 A1* | 9/2016 | Obrecht ................ C08F 236/12 |
| 2019/0031804 A1 | 1/2019 | Salem et al. |

FOREIGN PATENT DOCUMENTS

| | | | |
|---|---|---|---|
| DE | 23 39 132 A1 | 3/1977 | |
| DE | 30 46 008 A1 | 9/1981 | |
| DE | 30 46 251 A1 | 9/1981 | |
| DE | 32 27 650 A1 | 3/1983 | |
| DE | 33 29 974 A1 | 2/1985 | |
| EP | 0 111 412 A1 | 6/1984 | |
| EP | 0 185 244 A1 | 6/1986 | |
| EP | 1 247 835 A1 | 10/2002 | |
| EP | 2 392 599 A1 | 12/2011 | |
| EP | 2 471 852 A1 | 7/2012 | |
| EP | 2 868 676 A1 | 5/2015 | |
| EP | 2 868 677 A1 | 5/2015 | |
| EP | 3 196 240 A1 | 7/2017 | |
| EP | 3330294 A1 * | 6/2018 | ............. C08C 19/02 |
| FR | 2 540 503 A1 | 6/1984 | |
| GB | 1 558 491 A | 1/1980 | |
| JP | S61185515 * | 8/1986 | |
| JP | 2012 031311 A | 2/2012 | |
| KR | 20110038992 * | 4/2011 | |
| WO | 02 02657 A2 | 1/2002 | |
| WO | 02 100905 A1 | 12/2002 | |
| WO | 02 100941 A1 | 12/2002 | |
| WO | 2011 141275 A2 | 11/2011 | |

OTHER PUBLICATIONS

Translation of KR 2011-0038992 (Year: 2011).*
Translation of JPS61185515 (Year: 1986).*
Gerrens; "Kinetik der Eusionspolymmerisation"; 1959, 1, pp. 234-328.
Lovell, et al.; "Emulsion Polymerization and Emulsion Polymers"; 1997 John Wiley & Sons Ltd.
Houben Weyl, "Methoden der organischen Chemie, vol. XIV/1, Makromolekular Stoffe", Georg Thime Verlag, Stuttgart, 1961, pp. 645-673.
Search Report from corresponding EP application 17 290 164.7 dated Jun. 27, 2018.
Written Opinion of the International Searching Authority dated Feb. 11, 2019 in corresponding PCT/EP2018/084755.
English translation of International Search Report dated Feb. 11, 2019.

* cited by examiner

*Primary Examiner* — Robert C Boyle
(74) *Attorney, Agent, or Firm* — Norris McLaughlin, P.A.

(57) ABSTRACT

The present invention relates to nitrile-diene-carboxylic ester copolymers, to the preparation thereof, to vulcanizable compositions containing nitrile-diene-carboxylic ester copolymers and the production thereof, and to vulcanizates based on nitrile-diene-carboxylic ester copolymers and to the use thereof in elastomeric components.

9 Claims, No Drawings

NITRILE-DIENE-CARBOXYLIC ACID ESTER COPOLYMERS

The present invention relates to nitrile-diene-carboxylic ester copolymers, to the preparation thereof, to vulcanizable compositions containing nitrile-diene-carboxylic ester copolymers and the production thereof, and to vulcanizates based on nitrile-diene-carboxylic ester copolymers and to the use thereof in elastomeric components.

In the context of this application, the term "nitrile-diene copolymer" (nitrile rubber, also abbreviated to "NBR") is understood to mean rubbers which are co-, ter- or quaterpolymers of at least one α,β-ethylenically unsaturated nitrile, at least one conjugated diene and optionally one or more additional copolymerizable monomers.

For many years, NBR has occupied an established position in the specialty elastomers sector. It has an excellent profile of properties in the form of excellent oil resistance and good heat stability. NBR also has very good mechanical and performance properties. For this reason, it finds wide use in a wide variety of different fields of use, and it is used, for example, for production of gaskets, hoses in the automotive and mechanical engineering sector, and also the numerous elastomeric components in the construction, roller and electrical industries.

For many applications it is crucial that the vulcanizate based on NBR has a low glass transition temperature (Tg) so that the functionality of the vulcanizate is ensured even at low temperatures. In addition, it is also necessary for the vulcanizate to exhibit the smallest possible swelling in contact with for example oil or fuels since otherwise the vulcanizate increases in volume and is no longer fit for use.

It is known that NBR copolymers of acrylonitrile and butadiene have a lower glass transition temperature as the amount of acrylonitrile decreases.

Conversely, it is known that NBR copolymers of acrylonitrile and butadiene have lower swelling in oil and fuel as the amount of acrylonitrile increases.

A multitude of different NBR types are commercially available, and these feature, according to the application sector, different monomers, molecular weights and polydispersities, and consequently different mechanical and physical properties. As well as the standard types, there is increasing demand particularly for specialty types featuring contents of special termonomers or particular functionalizations.

Examples of known special termonomers include α,β-ethylenically unsaturated carboxylic acids (e.g. acrylic acid and methacrylic acid). Terpolymers having these termonomers are referred to collectively as XNBR where the "X" represents the acid group. Examples of these include monocarboxylic acids, dicarboxylic acids and dicarboxylic monoesters (e.g. monomethyl maleate or monobutyl maleate).

Likewise known are terpolymers with α,β-ethylenically unsaturated carboxylic ester units (including monocarboxylic esters such as methyl acrylate and butyl acrylate or dicarboxylic monoesters such as monobutyl maleate).

EP-A-185244 and EP-A-1247835 disclose copolymers containing nitrile groups and having copolymerized carboxylic ester monomers. Butyl acrylate and 2-ethylhexyl acrylate were used as carboxylic ester monomer in amounts of 5% to 50% by weight.

WO-A-11/141275 discloses copolymers containing nitrile groups with hydroxyethyl acrylate (HEA) or hydroxyethyl methacrylate (HEMA) as hydroxyl-containing termonomer. The amount of termonomer incorporated is in the range from 2.0% to 4.8% by weight.

EP-A-2471852 discloses copolymers containing nitrile groups with glycidyl methacrylate as carboxylic ester termonomer containing epoxy groups. The amount of termonomer incorporated is 1.2% to 7.2% by weight.

Also known are nitrile-diene-carboxylic ester copolymers with PEG acrylate units as termonomers.

EP-A-2868677 discloses a copolymer containing nitrile groups and having 1% to 9% by weight of monocarboxylic monoester units having a glass transition temperature of less than −20° C. and oil swelling of less than 20%. Explicitly disclosed therein are terpolymers with 4.8% by weight and 7.7% by weight of methoxyethyl acrylate, i.e. PEG-1 acrylate, or with 4.1% by weight of PEG-5 methacrylate.

EP-A-2868676 discloses a copolymer containing nitrile groups and having 1% to 9% by weight of α,β-ethylenically unsaturated monomer units containing carbonyl groups. Explicit examples disclosed include hydrogenated terpolymers having PEG-11-functionalized methacrylic acid monomers.

EP-A-2392599 discloses an at least partly hydrogenated nitrile-butadiene copolymer containing 5% to 60% by weight of α,β-ethylenically unsaturated nitrile units, 20% to 83.9% by weight of conjugated diene units, 0.1% to 20% by weight of dicarboxylic monoester units, 11% to 50% by weight of alkoxyalkyl (meth)acrylate units having 2 to 8 carbon atoms. Table 2 describes, inter alia, quaterpolymers having a content of 21.3% or 24.8% by weight of acrylonitrile, 46.6% or 47.3% by weight of butadiene, 4.5% to 5% by weight of mono-n-butyl maleate and 23.0% or 27.1% by weight of methoxyethyl acrylate.

JP-A-2012-031311 describes a highly saturated copolymer rubber containing nitrile groups and containing (a) 10.0% to 40.0% by weight of α,β-ethylenically unsaturated nitrile units, (b) 5.5% to 10.0% by weight of α,β-ethylenically unsaturated dicarboxylic monoester units, (c) 11.0% to 30.0% by weight of alkoxyalkyl (meth)acrylate units having alkoxyalkyl groups having 2 to 8 carbon atoms, and (d) 20.0% to 73.5% by weight of conjugated diene units, where at least some of the conjugated diene units have been hydrogenated.

EP-A-3196240 discloses unhydrogenated nitrile-butadiene-PEG acrylate copolymers comprising 8.7% to 22% by weight of acrylonitrile, 52.4% to 61.9% by weight of butadiene and 10% to 25% by weight of ethoxy triethylene glycol methacrylate (PEG-3-MA) or methoxy octaethylene glycol methacrylate (PEG-8-MA). There is no disclosure of nitrile-diene-carboxylic ester copolymers with butyldiglycol methacrylate (BDGMA).

The choice of monomer(s) and the amount of the monomers used has a crucial influence on the polymer properties and vulcanizate properties and is thus not readily predictable.

The previously disclosed nitrile-butadiene-carboxylic ester copolymers which, aside from nitrile units and diene units, contain as termonomer units exclusively monocarboxylic acids, carboxylic esters such as butyl acrylate or monobutyl maleate, PEG-1 acrylate or small amounts of PEG acrylate do not adequately meet the requirement for a low glass transition temperature and simultaneously low swelling.

Accordingly, the problem addressed by the present invention was that of providing a nitrile-diene copolymer which, in a vulcanizate, simultaneously has a low glass transition temperature and low swelling in oil and fuel.

A further problem addressed by the present invention was that of providing a vulcanizate based on a nitrile-diene copolymer which has a glass transition temperature of less than −40° C. and has swelling in Fuel C after 3 days at 100° C. of less than 50%. In addition, a further problem addressed was that of achieving a similar balance in the dynamic and mechanical properties of the HNBR copolymer provided to that in existing NBR polymers.

The solution to the problems provided by the present invention is a nitrile-diene-carboxylic ester copolymer containing
(a) 5% to 80% by weight, preferably 10% to 60% by weight and more preferably 15% to 40% by weight of at least one α,β-ethylenically unsaturated nitrile unit,
(b) 10% to 90% by weight, preferably 20% to 80% by weight and more preferably 30% to 65% by weight of at least one conjugated diene unit and
(c) 5% to 50% by weight, preferably 10% to 40% by weight and more preferably 20% to 30% by weight of at least one PEG acrylate unit (c) derived from the general formula (I)

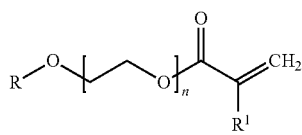

Formula (I)

where
R is unbranched or branched $C_1$-$C_{20}$-alkyl, preferably $C_2$-$C_{20}$-alkyl, more preferably ethyl, butyl or ethylhexyl,
n is 2 to 12, preferably 2 to 8, more preferably 2 to 5 and most preferably 2 or 3 and
$R^1$ is hydrogen or methyl.

It should be noted at this point that the scope of the invention includes any and all possible combinations of the components, ranges of values, radical definitions and/or process parameters mentioned above and cited hereinafter, in general terms or within areas of preference.

The term "copolymer" encompasses polymers having more than one monomer unit.

In one embodiment of the invention, the copolymer is derived exclusively, for example, from the three monomer types (a), (b) and (c) and is therefore a terpolymer.

Likewise also encompassed by the term copolymer are, for example, quaterpolymers derived from the three monomer types (a), (b) and (c) and a further α,β-ethylenically unsaturated monomer unit (d) other than the PEG acrylate unit (c).

The term "nitrile-diene-carboxylic ester copolymer" in the context of the present invention refers to a copolymer containing at least one α,β-ethylenically unsaturated nitrile unit, at least one conjugated diene unit and at least one α,β-ethylenically unsaturated carboxylic ester unit. The term thus also encompasses copolymers having two or more different α,β-ethylenically unsaturated nitrile monomer units, two or more different conjugated diene monomer units and two or more different α,β-ethylenically unsaturated carboxylic ester units.

(a) α,β-Ethylenically Unsaturated Nitrile

The α,β-ethylenically unsaturated nitrile used, which forms the α,β-ethylenically unsaturated nitrile units (a), may be any known α,β-ethylenically unsaturated nitrile. Preference is given to ($C_3$-$C_5$)-α,β-ethylenically unsaturated nitriles such as acrylonitrile, α-haloacrylonitrile, for example α-chloroacrylonitrile and α-bromoacrylonitrile, α-alkylacrylonitrile, for example methacrylonitrile, ethacrylonitrile or mixtures of two or more α,β-ethylenically unsaturated nitriles.

Particular preference is given to acrylonitrile, methacrylonitrile, ethacrylonitrile or mixtures thereof. Very particular preference is given to acrylonitrile.

The amount of α,β-ethylenically unsaturated nitrile units (a) is typically in the range from 5% to 80% by weight, preferably 10% to 60% by weight, more preferably from 15% to 40% by weight, based on the total amount of 100% by weight of all monomer units of the nitrile-diene-carboxylic ester copolymer.

(b) Conjugated Diene

The conjugated diene which forms the conjugated diene units (b) may be of any type, especially conjugated $C_4$-$C_{12}$ dienes. Particular preference is given to 1,3-butadiene, isoprene, 2,3-dimethylbutadiene, 1,3-pentadiene (piperylene) or mixtures thereof. Especially preferred are 1,3-butadiene and isoprene or mixtures thereof. Very particular preference is given to 1,3-butadiene.

The amount of conjugated diene is typically in the range from 10% to 90% by weight, preferably 20% to 80% by weight and more preferably 30% to 65% by weight, based on the total amount of 100% by weight of all monomer units of the nitrile-diene-carboxylic ester copolymer.

(c) α,β-Ethylenically Unsaturated Carboxylic Ester

In addition to the α,β-ethylenically unsaturated nitrile units and the conjugated diene units, the nitrile-diene-carboxylic ester copolymer contains, as a third unit, at least one PEG acrylate unit (c) derived from the general formula (I)

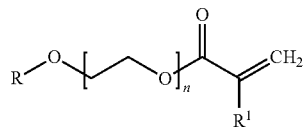

Formula (I)

where
R is unbranched or branched $C_1$-$C_{20}$-alkyl, preferably $C_2$-$C_{20}$-alkyl, more preferably ethyl, butyl or ethylhexyl,
n is 2 to 12, preferably 2 to 8, more preferably 2 to 5 and most preferably 2 or 3 and
$R^1$ is hydrogen or methyl.

The term "(meth)acrylate" in the context of this invention represents "acrylate" and "methacrylate". When the IV radical in the general formula (I) is methyl, the molecule is a methacrylate.

The term "polyethylene glycol" or the abbreviation "PEG" in the context of this invention represents ethylene glycol sections having two repeat ethylene glycol units (PEG-2; n=2) to 12 repeat ethylene glycol units (PEG-2 to PEG-12; n=2 to 12).

The term "PEG acrylate" is also abbreviated to PEG-X-(M)A where "X" is the number of repeat ethylene glycol units, "MA" is methacrylate and "A" is acrylate.

Acrylate units derived from PEG acrylates of general formula (I) are referred to in the context of the present invention as "PEG acrylate unit" (c).

Preferred PEG acrylate units (c) are derived from the PEG acrylates having the following formulae no. 1 to no. 8, wherein n is 2, 3, 4, 5, 6, 7, 8, 9, 10, 11 or 12, preferably 2, 3, 4, 5, 6, 7 or 8, more preferably 2, 3, 4 or 5 and most preferably 2 or 3:

(Formula no. 1)
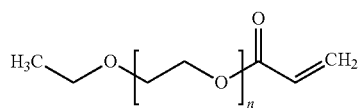
Ethoxy polyethylene glycol acrylate (Formula no. 2)
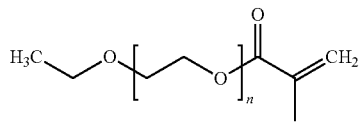
Ethoxy polyethylene glycol methacrylate (Formula no. 3)
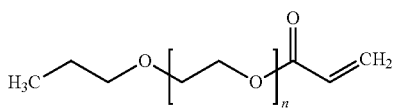
Propoxy polyethylene glycol acrylate (Formula no. 4)
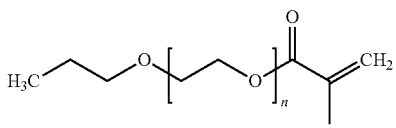
Propoxy polyethylene glycol methacrylate (Formula no. 5)
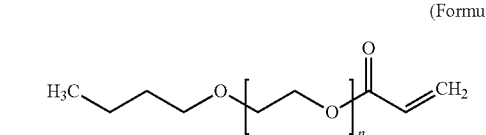
Butoxy polyethylene glycol acrylate (Formula no. 6)
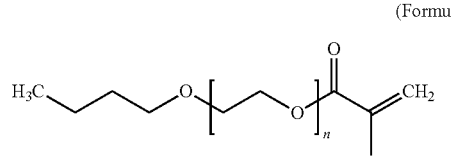
Butoxy polyethylene glycol methacrylate (Formula no. 7)
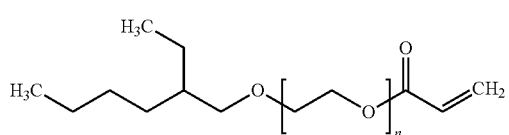
Ethylhexyloxy polyethylene glycol acrylate (Formula no. 8)
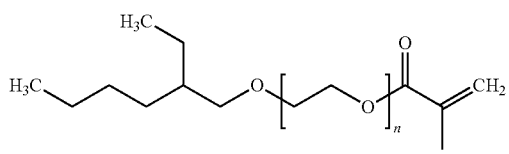
Ethylhexyloxy polyethylene glycol methacrylate Other commonly used designations for ethoxy polyethylene glycol acrylate (formula no. 1) are for example poly(ethylene glycol) ethyl ether acrylate, ethoxy PEG acrylate, ethoxy poly(ethylene glycol) monoacrylate or poly(ethylene glycol) monoethyl ether monoacrylate.

The most preferred carboxylic ester unit (c) is butoxy diethylene glycol methacrylate (butyldiglycol methacrylate, BDGMA).

These PEG acrylates can be purchased commercially, for example from Arkema under the Sartomer® trade name, from Evonik under the Visiomer® trade name, or from Sigma Aldrich.

The amount of the PEG acrylate units (c) in copolymers of the invention is in the range from 5% to 50% by weight, preferably 10% to 40% by weight and more preferably 20% to 30% by weight, based on the total amount of 100% by weight of all the monomer units.

(d) α,β-Ethylenically Unsaturated Carboxylic Ester Units

In alternative embodiments, the nitrile-diene-carboxylic ester copolymers according to the invention may have further α,β-ethylenically unsaturated carboxylic esters (d) other than the PEG acrylate units (c).

Typical α,β-ethylenically unsaturated carboxylic ester units (d) other than the PEG acrylate units (c) are
- alkyl (meth)acrylate, especially $C_1$-$C_{18}$-alkyl (meth)acrylate, preferably methyl, ethyl, propyl, n-butyl, tert-butyl, n-pentyl or n-hexyl (meth)acrylate;
- alkoxyalkyl (meth)acrylate, especially $C_4$-$C_{18}$-alkoxyalkyl (meth)acrylate, preferably $C_4$-$C_{12}$-alkoxyalkyl (meth)acrylate;
- hydroxyalkyl (meth)acrylate, especially $C_4$-$C_{18}$-hydroxyalkyl (meth)acrylate, preferably $C_4$-$C_{12}$-hydroxyalkyl (meth)acrylate;
- cycloalkyl (meth)acrylate, especially $C_5$-$C_{18}$-cycloalkyl (meth)acrylate, preferably $C_6$-$C_{12}$-cycloalkyl (meth)acrylate, more preferably cyclopentyl (meth)acrylate, cyclohexyl (meth)acrylate, cycloheptyl (meth)acrylate;
- alkylcycloalkyl (meth)acrylate, especially $C_6$-$C_{12}$-alkylcycloalkyl (meth)acrylate, preferably $C_7$-$C_{10}$-alkylcycloalkyl (meth)acrylate, more preferably methylcyclopentyl (meth)acrylate and ethylcyclohexyl (meth)acrylate;
- aryl monoesters, especially $C_6$-$C_{14}$-aryl monoesters, preferably phenyl (meth)acrylate or benzyl (meth)acrylate;
- amino-containing α,β-ethylenically unsaturated carboxylic esters, for example dimethylaminomethyl acrylate or diethylaminoethyl acrylate;
- α,β-ethylenically unsaturated monoalkyl dicarboxylates, preferably
  - alkyl monoesters, especially $C_1$-$C_{18}$-alkyl monoesters, preferably methyl, ethyl, propyl, n-butyl, tert-butyl, n-pentyl or n-hexyl monoesters, more preferably mono-n-butyl maleate, mono-n-butyl fumarate, mono-n-butyl citraconate, mono-n-butyl itaconate, most preferably mono-n-butyl maleate,
  - alkoxyalkyl monoesters, especially $C_4$-$C_{18}$-alkoxyalkyl monoesters, preferably $C_4$-$C_{12}$-alkoxyalkyl monoesters,
  - hydroxyalkyl monoesters, especially $C_4$-$C_{18}$-hydroxyalkyl monoesters, preferably $C_4$-$C_{12}$-hydroxyalkyl monoesters,
  - cycloalkyl monoesters, especially $C_5$-$C_{18}$-cycloalkyl monoesters, preferably $C_6$-$C_{12}$-cycloalkyl monoesters, more preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate, alkylcycloalkyl monoesters, especially $C_6$-$C_{12}$-alkylcycloalkyl monoesters, preferably $C_7$-$C_{10}$-alkylcycloalkyl monoesters, more preferably monomethylcyclopentyl maleate and monoethylcyclohexyl maleate, monomethylcyclopentyl fumarate and monoethylcyclohexyl fumarate, monomethylcyclopentyl citraconate and monoethylcyclohexyl citraconate; monomethylcyclopentyl itaconate and monoethylcyclohexyl itaconate;

aryl monoesters, especially $C_6$-$C_{14}$-aryl monoesters, preferably monoaryl maleates, monoaryl fumarates, monoaryl citraconates or monoaryl itaconates, more preferably monophenyl maleate or monobenzyl maleate, monophenyl fumarate or monobenzyl fumarate, monophenyl citraconate or monobenzyl citraconate, monophenyl itaconate or monobenzyl itaconate, unsaturated polyalkyl polycarboxylates, for example dimethyl maleate, dimethyl fumarate, dimethyl itaconate or diethyl itaconate;

or mixtures thereof.

(e) Copolymerizable Monomers

In addition, the nitrile-diene-carboxylic ester copolymer may contain one or more further copolymerizable monomers (e) in an amount of 0% by weight to 20% by weight, preferably 0.1% by weight to 10% by weight, based on the total amount of 100% by weight of all monomer units. In that case, the amounts of the other monomer units (a), (b), (c) and optionally (d) are suitably reduced, such that the sum total of all monomer units is always 100% by weight. The nitrile-diene-carboxylic ester copolymer may contain, as further copolymerizable monomers (e), one or more aromatic vinyl monomers, preferably styrene, α-methylstyrene and vinylpyridine, fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, or else α-olefins, preferably $C_2$-$C_{12}$ olefins, for example ethylene, 1-butene, 2-butene, 4-methyl-1-pentene, 1-hexene or 1-octene, non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicyclopentadiene or else alkynes such as 1- or 2-butyne, α,β-ethylenically unsaturated monocarboxylic acids, preferably acrylic acid, methacrylic acid, crotonic acid or cinnamic acid, α,β-ethylenically unsaturated dicarboxylic acids, preferably maleic acid, fumaric acid, citraconic acid, itaconic acid, copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy) aniline, N-phenyl-4-(4-vinylbenzyloxy)aniline or crosslinkable monomers, free-radically polymerizable compounds containing at least two olefinic double bonds per molecule, for example divinyl components, for example divinylbenzene or ethylene glycol diacrylate, diethylene glycol dimethacrylate and triethylene glycol diacrylate.

In a preferred embodiment, the nitrile-diene-carboxylic ester copolymer according to the invention contains, as PEG acrylate units (c), ethoxy, butoxy or ethylhexyloxy polyethylene glycol (meth)acrylate having 2 to 12 repeat ethylene glycol units, more preferably ethoxy or butoxy polyethylene glycol (meth)acrylate with 2 to 5 repeat ethylene glycol units and most preferably ethoxy or butoxy polyethylene glycol (meth)acrylate with 2 or 3 repeat ethylene glycol units.

In a further alternative embodiment of the nitrile-diene-carboxylic ester copolymer, n is 2 or 3, R is ethyl or butyl and $R^1$ is hydrogen or methyl, preferably n is 2, R is butyl and R' is methyl.

In an alternative embodiment, the nitrile-diene-carboxylic ester copolymer according to the invention contains not only the α,β-ethylenically unsaturated nitrile unit (a), the conjugated diene unit (b) and the PEG acrylate unit (c) derived from a PEG acrylate of general formula (I), but also, as unsaturated carboxylic ester unit (d), an α,β-ethylenically unsaturated monoalkyl dicarboxylate unit, preferably monobutyl maleate.

In an alternative embodiment of the nitrile-diene-carboxylic ester copolymer according to the invention, the α,β-ethylenically unsaturated nitrile unit (a) is derived from acrylonitrile or methacrylonitrile, more preferably from acrylonitrile, the conjugated diene unit (b) is derived from isoprene or 1,3-butadiene, more preferably from 1,3-butadiene, and the PEG acrylate unit (c) is derived from a PEG acrylate of the general formula (I) where n is 2 to 12, more preferably from PEG acrylate of the general formula (I) with n=2 or 3.

In an alternative embodiment of the nitrile-diene-carboxylic ester copolymer according to the invention, the α,β-ethylenically unsaturated nitrile unit (a) is derived from acrylonitrile or methacrylonitrile, more preferably from acrylonitrile, the conjugated diene unit (b) from isoprene or 1,3-butadiene, more preferably from 1,3-butadiene, and the PEG acrylate unit (c) is derived from PEG acrylate of the general formula (I) where n is 2 to 8, more preferably from PEG acrylate of the general formula (I) where n is 2 or 3, where no further carboxylic ester unit (d) is present.

In a further alternative embodiment the nitrile-diene-carboxylic ester copolymer includes 5% to 80% by weight of acrylonitrile units, 10% to 90% by weight of 1,3-butadiene units and 5% to 50% by weight of PEG-2 acrylate units or PEG-3 acrylate units.

In a very particularly preferred embodiment, the nitrile-diene-carboxylic ester copolymer contains 15% to 40% by weight of α,β-ethylenically unsaturated nitrile unit (a), preferably acrylonitrile, 30% to 65% by weight of the conjugated diene unit (b), preferably 1,3-butadiene, and 20% to 30% by weight of PEG acrylate unit (c), derived from a PEG acrylate of general formula (I), preferably butoxy diethylene glycol (meth)acrylate.

In the most preferred embodiment, the nitrile-diene-carboxylic ester copolymer contains 15% to 40% by weight of acrylonitrile units, 30% to 65% by weight of 1,3-butadiene units and 20% to 30% by weight of butoxy diethylene glycol methacrylate units.

The nitrile-diene-carboxylic ester copolymer according to the invention typically has a number-average molecular weight (Mn) of 5000 g/mol to 2 000 000 g/mol, preferably 10 000 g/mol to 1 000 000 g/mol, more preferably 30 000 g/mol to 500 000 g/mol and most preferably 40 000 g/mol to 300 000 g/mol, based on polystyrene.

The nitrile-diene-carboxylic ester copolymer according to the invention typically has a polydispersity index (PDI=$M_w$/

$M_n$ where $M_W$ is the weight-average molecular weight) of 1.5 to 6, preferably 2 to 5 and more preferably 2.5 to 4.5.

The nitrile-diene-carboxylic ester copolymer according to the invention typically has a Mooney viscosity (ML1+4@100° C.) of 10 to 150, preferably of 20 to 140 and more preferably of 25 to 120.

Process for Producing Unhydrogenated Nitrile-Diene-Carboxylic Ester Copolymers

The invention further provides a process for producing unhydrogenated nitrile-diene-carboxylic ester copolymers, characterized in that at least one α,β-ethylenically unsaturated nitrile, at least one conjugated diene and at least one α,β-ethylenically unsaturated carboxylic monoester are subjected to an emulsion polymerization.

The invention preferably provides a process for producing unhydrogenated nitrile-diene-carboxylic ester copolymers, characterized in that 5% to 80% by weight, preferably 10% to 60% by weight and more preferably 15% to 40% by weight of at least one α,β-ethylenically unsaturated nitrile, 10% to 90% by weight, preferably 20% to 80% by weight and more preferably 30% to 65% by weight of at least one conjugated diene and 5% to 50% by weight, preferably 10% to 40% by weight and more preferably 20% to 30% by weight of at least one α,β-ethylenically unsaturated carboxylic ester, PEG acrylate of the general formula (I)

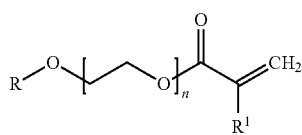

Formula (I)

where
R is unbranched or branched $C_1$-$C_{20}$-alkyl, preferably $C_2$-$C_{20}$-alkyl, more preferably ethyl, butyl or ethylhexyl,
n is 2 to 12, preferably 2 to 8, more preferably 2 to 5 and most preferably 2 or 3 and
$R^1$ is hydrogen or methyl,
are subjected to an emulsion polymerization.

The unhydrogenated nitrile-diene-carboxylic ester copolymers can be prepared by polymerization of the abovementioned monomers and has been described extensively in the literature (e.g. Houben-Weyl, Methoden der Organischen Chemie [Methods of Organic Chemistry], vol. 14/1, Georg Thieme Verlag Stuttgart 1961) and is not particularly restricted. In general, the process is one in which α,β-ethylenically unsaturated nitrile units, conjugated diene units and PEG acrylate units are copolymerized as desired. The polymerization process used may be any known emulsion polymerization process, suspension polymerization process, bulk polymerization process and solution polymerization process. Preference is given to the emulsion polymerization process. Emulsion polymerization is especially understood to mean a process known per se in which the reaction medium used is usually water (see, inter alia, Rompp Lexikon der Chemie [Rompp's Chemistry Lexicon], volume 2, 10th edition 1997; P. A. Lovell, M. S. El-Aasser, Emulsion Polymerization and Emulsion Polymers, John Wiley & Sons, ISBN: 0471 96746 7; H. Gerrens, Fortschr. Hochpolym. Forsch. 1, 234 (1959)). The incorporation rate of the termonomer may readily be adjusted by the person skilled in the art such that an inventive terpolymer is obtained. The monomers may be initially charged or reacted by incrementation in two or more steps.

The polymerization can be performed either batchwise or else continuously in a stirred tank cascade.

In addition, polymerization is frequently effected in the presence of what are called molecular weight regulators in order to control the molecular weight. These are generally alkyl thiols containing 9-16 carbon atoms. Such alkyl thiols or (isomer) mixtures of alkyl thiols are either commercially available or else are preparable by processes sufficiently well-described in the literature for the person skilled in the art.

The invention also provides the nitrile-diene-carboxylic ester copolymer latex optionally containing a phenolic, aminic and also other ageing stabilizers, comprising the nitrile-diene-carboxylic ester copolymer according to the invention. Nitrile-diene-carboxylic ester copolymer latex serves as intermediate for production of nitrile-diene-carboxylic ester copolymer latex as solid rubber.

Before or in the course of latex coagulation, one or more ageing stabilizers may be added to the latex. Suitable for this purpose are phenolic, aminic and also other ageing stabilizers.

For the coagulation, the latex is adjusted to a pH known to the person skilled in the art, by addition of a base, preferably ammonia or sodium hydroxide or potassium hydroxide, or of an acid, preferably sulfuric acid or acetic acid.

In one embodiment of the process, the coagulation is conducted using at least one salt selected from the group consisting of aluminium salts, calcium salts, magnesium salts, sodium salts, potassium salts and lithium salts. Anions used in these salts are typically mono- or divalent anions. Preference is given to halides, more preferably chloride, nitrate, sulfate, hydrogencarbonate, carbonate, formate and acetate.

The salts are added in an amount of 0.05% to 10% by weight, preferably 0.1% to 8% by weight, more preferably 0.2% to 5% by weight, based on the solids content of the latex dispersion.

As well as at least one salt from the above-defined group, it is also possible to use precipitation aids in the coagulation. Useful precipitation aids include, for example, water-soluble polymers. These are nonionic, anionic or cationic.

The latex used for coagulation appropriately has a solids concentration in the range from 1% to 40%, preferably in the range from 5% to 35% and more preferably in the range from 15% to 30% by weight.

The latex coagulation is conducted within the temperature range from 10 to 110° C., preferably from 20 to 100° C., more preferably 50 to 98° C. The latex coagulation can be effected continuously or batchwise, preference being given to continuous operation.

In an alternative embodiment, the latex that has typically been separated from unconverted monomers is also treated with acids within a pH range of ≤6, preferably ≤4, more preferably 2, which results in precipitation of the polymer. Precipitation can be accomplished using any mineral and organic acids that permit establishment of the chosen pH ranges. Mineral acids are preferably used for pH adjustment.

Subsequently, the polymer is separated from the suspension in the manner customary to the person skilled in the art. This too can be effected continuously or batchwise, preference being given to continuous operation.

After the coagulation, the nitrile rubber is typically in the form of what are called crumbs. The wash of the coagulated NBR is therefore also referred to as "crumb wash". For this wash, it is possible to use either deionized water or non-deionized water. The wash is conducted at a temperature in the range from 15 to 90° C., preferably at a temperature in the range from 20 to 80° C. The amount of wash water is 0.5 to 20 parts by weight, preferably 1 to 10 parts by weight and more preferably 1 to 5 parts by weight, based on 100 parts by weight of nitrile rubber. Preferably, the rubber crumbs are subjected to a multistage wash, with partial dewatering of the rubber crumbs between the individual wash stages. The residual moisture contents of the crumbs between the individual wash stages are in the range from 5% to 50% by weight, preferably in the range from 7% to 25% by weight. The number of wash stages is typically 1 to 7, preferably 1 to 3. The wash is conducted batchwise or continuously. Preference is given to using a multistage continuous process, preference being given to a countercurrent wash for conservative water management. On conclusion of the wash, it has been found to be useful to dewater the nitrile rubber crumbs. The previously dewatered nitrile rubber is dried in a dryer, suitable examples being fluidized bed dryers or plate dryers. The drying temperatures are 80 to 150° C. Preference is given to drying with a temperature programme, with lowering of the temperature toward the end of the drying operation.

Metathesis and/or Hydrogenation:

It is also possible for the production of the unhydrogenated nitrile-diene-carboxylic ester copolymer to be followed by a metathesis reaction for reduction of the molecular weight of the nitrile-diene-carboxylic ester copolymer or a metathesis reaction and a subsequent hydrogenation or a hydrogenation only. These metathesis or hydrogenation reactions are well known to those skilled in the art and are described in the literature.

Metathesis is known, for example, from WO-A-02/100941 and WO-A-02/100905 and can be used to reduce the molecular weight.

The hydrogenation of nitrile-diene copolymers is known, for example from U.S. Pat. No. 3,700,637, DE-A-2 539 132, DE-A-3 046 008, DE-A-3 046 251, DE-A-3 227 650, DE-A-3 329 974, EP-A-111 412, FR-B 2 540 503. Hydrogenated nitrile-diene copolymers feature not only high breaking strength, low abrasion, consistently low deformation after compressive and tensile stress and good oil resistance but also in particular remarkable stability to thermal and oxidative influences.

The invention further provides a hydrogenated nitrile-diene-carboxylic ester copolymer based on the nitrile-diene-carboxylic ester copolymer according to the invention. Hydrogenated nitrile-diene-carboxylic ester copolymer is obtainable from the hydrogenation of nitrile-diene-carboxylic ester copolymer according to the invention. Preference is given to a hydrogenated nitrile-diene copolymer rubber having 15% to 40% by weight of acrylonitrile units, 20% to 30% by weight of butyl diglycol methacrylate and 30% to 65% by weight of butadiene in fully or partly hydrogenated form.

The term "hydrogenated" means that the degree of the hydrogenation of the butadiene units in the hydrogenated nitrile-diene-carboxylic ester copolymer, and it is 50% to 100%, preferably 90% to 100%, more preferably 95% to 100% and most preferably 99% to 100%.

Vulcanizable Compositions Comprising Nitrile-Diene-Carboxylic Ester Copolymers

The present invention further provides vulcanizable compositions comprising at least one optionally hydrogenated nitrile-diene-carboxylic ester copolymer according to the invention and at least one crosslinker.

A preferred embodiment involves vulcanizable compositions comprising at least one nitrile-diene-carboxylic ester copolymer according to the invention, at least one crosslinker and additionally at least one filler.

Useful crosslinkers include, for example, peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)-hex-3-yne.

In addition to these peroxidic crosslinkers it may be advantageous to use further additions which can help to increase the crosslinking yield: suitable examples thereof include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, zinc diacrylate, zinc dimethacrylate, 1,2-polybutadiene or N,N'-m-phenylenedimaleimide.

The total amount of the crosslinker(s) is typically in the range from 1 to 20 phr, preferably in the range from 1.5 to 15 phr and more preferably in the range from 2 to 10 phr, based on the nitrile rubber.

Crosslinkers used may also be sulfur in elemental soluble or insoluble form, or sulfur donors.

Useful sulfur donors include, for example, dimorpholyl disulfide (DTDM), 2-morpholinodithiobenzothiazole (MBSS), caprolactam disulfide, dipentamethylenethiuram tetrasulfide (DPTT) and tetramethylthiuram disulfide (TMTD).

It is also possible to use further additions which can help to increase the crosslinking yield in the sulfur vulcanization of the nitrile rubbers of the invention. In principle, the crosslinking can also be effected with sulfur or sulfur donors alone.

Conversely, crosslinking of the nitrile rubbers of the invention can also be effected only in the presence of the abovementioned additions, i.e. without addition of elemental sulfur or sulfur donors.

Suitable additions which can help to increase the crosslinking yield are, for example, dithiocarbamates, thiurams, thiazoles, sulfenamides, xanthogenates, guanidine derivatives, caprolactams and thiourea derivatives.

Dithiocarbamates used may be, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (ZSMC), tellurium diethyldithiocarbamate, nickel dibutyldithiocarbamate, nickel dimethyldithiocarbamate and zinc diisononyldithiocarbamate.

Thiurams used may be, for example, tetramethylthiuram disulfide (TMTD), tetramethylthiuram monosulfide (TMTM), dimethyldiphenylthiuram disulfide, tetrabenzylthiuram disulfide, dipentamethylenethiuram tetrasulfide or tetraethylthiuram disulfide (TETD).

Thiazoles used may be, for example, 2-mercaptobenzothiazole (MBT), dibenzothiazyl disulfide (MBTS), zinc mercaptobenzothiazole (ZMBT) or copper 2-mercaptobenzothiazole.

Sulfenamide derivatives used may be, for example, N-cyclohexyl-2-benzothiazylsulfenamide (CBS), N-tert-butyl-2-benzothiazylsulfenamide (TBBS), N,N'-dicyclohexyl-2-benzothiazylsulfenamide (DCBS), 2-morpholinothiobenzothiazole (MBS), N-oxydiethylenethiocarbamyl-N-tert-butylsulfenamide or oxydiethylenethiocarbamyl-N-oxyethylenesulfenamide.

Xanthogenates used may be, for example, sodium dibutylxanthogenate, zinc isopropyldibutylxanthogenate or zinc dibutylxanthogenate.

Guanidine derivatives used may be, for example, diphenylguanidine (DPG), di-o-tolylguanidine (DOTG) or o-tolylbiguanide (OTBG).

Dithiophosphates used may be, for example, zinc dialkyldithiophosphates (chain length of the alkyl radicals C2 to C16), copper dialkyldithiophosphates (chain length of the alkyl radicals C2 to C16) or dithiophosphoryl polysulfide.

A caprolactam used may be, for example, dithiobiscaprolactam.

Thiourea derivatives used may be, for example, N,N'-diphenylthiourea (DPTU), diethylthiourea (DETU) and ethylenethiourea (ETU).

Equally suitable as additions are, for example, zinc diaminodiisocyanate, hexamethylenetetramine, 1,3-bis(citraconimidomethyl)benzene and cyclic disulfanes.

The additions and crosslinking agents mentioned can be used either individually or in mixtures. Preference is given to using the following substances for the crosslinking of the nitrile rubbers: sulfur, 2-mercaptobenzothiazole, tetramethylthiuram disulfide, tetramethylthiuram monosulfide, zinc dibenzyldithiocarbamate, dipentamethylenethiuram tetrasulfide, zinc dialkyldithiophosphate, dimorpholyl disulfide, tellurium diethyldithiocarbamate, nickel dibutyldithiocarbamate, zinc dibutyldithiocarbamate, zinc dimethyldithiocarbamate and dithiobiscaprolactam.

The crosslinking agents and aforementioned additions can each be used in amounts of about 0.05 to 10 phr, preferably 0.1 to 8 phr, especially 0.5 to 5 phr (single dose, based in each case on the active substance).

In the case of the sulfur crosslinking according to the invention, it may even be advisable, in addition to the crosslinking agents and abovementioned additions, also to use further inorganic or organic substances as well, such as zinc oxide, zinc carbonate, lead oxide, magnesium oxide, saturated or unsaturated organic fatty acids and zinc salts thereof, polyalcohols, amino alcohols, for example triethanolamine, and amines, for example dibutylamine, dicyclohexylamine, cyclohexylethylamine and polyether amines.

In addition, it is also possible to use scorch retardants. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

As well as the addition of the crosslinker(s), the nitrile rubber according to the invention may also be mixed with further customary rubber additives.

These include, for example, the typical substances that are well-known to those skilled in the art, such as fillers, filler activators, antiozonants, ageing stabilizers, antioxidants, processing aids, extender oils, plasticizers, reinforcing materials and mould release agents.

Fillers used may be, for example, carbon black, silica, barium sulfate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Useful filler-activators include organic silanes in particular, for example vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler-activators are, for example, surface-active substances such as triethanolamine and ethylene glycols having molecular weights of 74 to 10 000 g/mol. The amount of filler-activators is typically 0 to 10 phr, based on 100 phr of the nitrile rubber.

Ageing stabilizers added to the vulcanizable mixtures may be those already described in the context of latex coagulation in this application. They are typically used as a mixture constituent in amounts of about 0 to 5 phr, preferably 0.5 to 3 phr, based on 100 phr of the nitrile rubber.

Examples of useful mould release agents include saturated or partly unsaturated fatty acids and oleic acids and derivatives thereof (fatty acid esters, fatty acid salts, fatty alcohols, fatty acid amides), which are preferably used as a mixture constituent, and also products applicable to the mould surface, for example products based on low molecular weight silicone compounds, products based on fluoropolymers and products based on phenolic resins.

The mould release agents are used as a mixture constituent in amounts of about 0 to 10 phr, preferably 0.5 to 5 phr, based on 100 phr of the nitrile rubber.

Another possibility is reinforcement with strengthening elements (fibres) made of glass, according to the teaching of U.S. Pat. No. 4,826,721, and another is reinforcement by cords, woven fabrics, fibres made of aliphatic and aromatic polyamides (Nylon®, Aramid®), polyesters and natural fibre products.

Process for Producing a Vulcanizable Composition Comprising Nitrile-Diene-Carboxylic Ester Copolymers The invention further provides a process for producing vulcanizable compositions comprising nitrile-diene-carboxylic ester copolymers by mixing the nitrile-diene-carboxylic ester copolymer with at least one crosslinker and the optionally further components present. This mixing operation may be performed in any mixing units customary in the rubber industry, for example internal mixers, Banbury mixers or rollers. The sequence of metered addition may be readily determined by the person skilled in the art through suitable tests.

Two possible procedural variants are set out hereinbelow by way of example:

Process A: Production in an internal mixer

Preference is given to internal mixers with intermeshing rotor geometry.

At the time of commencement, the internal mixer is charged with the nitrile-diene-carboxylic ester copolymer in bale form, and the bales are comminuted. After a suitable mixing period, the fillers and additives are added. The mixing is effected under temperature control, with the proviso that the mixture remains at a temperature in the range from 80° C. to 150° C. for a suitable time. After a further suitable mixing period, the further composition constituents are added, such as optionally stearic acid, antioxidants, plasticizers, white pigments (for example titanium dioxide), dyes and other processing actives. After a further suitable mixing period, the internal mixer is vented and the shaft is cleaned. After a further suitable period of time, the internal mixer is emptied to obtain the vulcanizable composition. Suitable periods of time are understood to mean a few seconds to a few minutes. The crosslinking chemicals may either be incorporated in a separate step on a roller, especially when mixing is performed at an elevated mixing temperature, or co-added directly in the internal mixer. It must be ensured in this case that the mixing temperature is below the reaction temperature of the crosslinking chemicals.

The vulcanizable compositions thus produced can be assessed in a customary manner, for instance by Mooney viscosity, by Mooney scorch or by a rheometer test.

Process B: Production on a roller

When rollers are used as mixing units the nitrile-diene-carboxylic acid copolymer is fed onto the roller first. Once a homogeneous milled sheet has been formed the fillers, plasticizers and other additives with the exception of the crosslinking chemicals are added. After incorporation of all components, the crosslinking chemicals are added and incorporated. The mixture is then incised three times on the right and three times on the left and doubled over 5 times. The finished milled sheet is rolled to the desired thickness and subjected to further processing according to the desired test methods.

Process for Producing Vulcanizates Comprising Nitrile-Diene-Carboxylic Ester Copolymers The invention further provides the process for producing vulcanizates, preferably in the form of mouldings, comprising nitrile-diene-carboxylic ester copolymers (vulcanization), characterized in that the vulcanizable composition comprising nitrile-diene-carboxylic ester copolymers is subjected to a vulcanization, preferably in a moulding process and more preferably at temperatures in the range from 100° C. to 250° C., especially preferably at temperatures in the range from 120° C. to 250° C. and very especially preferably temperatures in the range from 130° C. to 250° C. For this purpose, the vulcanizable compositions are subjected to further processing with calendars, rolls or extruders. The preformed/plastified mass is then vulcanized in presses, autoclaves, hot air systems, salt bath systems, infrared systems, UHF systems or in what are called automatic mat vulcanization systems ("Auma"), and preferred temperatures have been found to be in the range from 100° C. to 250° C., particularly preferred temperatures in the range from 120° C. to 250° C. and very particularly preferred temperatures in the range from 130° C. to 250° C. The vulcanization time is typically 1 minute to 24 hours and preferably 2 minutes to 1 hour. Depending on the shape and size of the vulcanizates, a second vulcanization by reheating may be necessary to achieve complete vulcanization.

The invention further provides the thus obtainable vulcanizates based on nitrile-diene-carboxylic ester copolymers according to the invention.

The invention also provides for the use of the vulcanizates based on nitrile-diene-carboxylic ester copolymers according to the invention for production of elastomeric components selected from the group consisting of belts, gaskets and gasket profiles, rollers, membranes, footwear components, hoses, damping elements, insulating materials, stators and cable sheaths, preferably hoses and gaskets.

The invention thus provides vulcanizates in the form of mouldings based on nitrile-diene-carboxylic ester copolymers according to the invention that are preferably selected from belts, gaskets and gasket profiles, rollers, membranes, footwear components, hoses, damping elements, insulating materials, stators and cable sheaths, preferably hoses and gaskets. The methods usable by way of example for this purpose, such as moulding, injection moulding or extrusion methods and the corresponding injection moulding apparatuses or extruders, are sufficiently well-known to the person skilled in the art. In the production of these mouldings, the nitrile-diene-carboxylic ester copolymers according to the invention may be supplemented with the standard auxiliaries that are known and can be suitably selected by those skilled in the art using their common art knowledge, for example fillers, filler-activators, accelerators, crosslinkers, antiozonants, antioxidants, processing oils, extender oils, plasticizers, activators or scorch inhibitors.

The particular advantage of the invention is that the nitrile-diene-carboxylic ester copolymers according to the invention are suitable for production of vulcanizates that have low swelling and simultaneously good cold flexibility, and hence are superior to the vulcanizate based on the known NBR copolymers.

EXAMPLES

Test Methods:

The values for the Mooney viscosity (ML 1+4@100° C.) are determined in each case by means of a shearing disc viscometer in accordance with DIN 53523/3 or ASTM D 1646 at 100° C.

The nitrogen content for determination of the ACN content in the copolymer rubbers containing nitrile groups is determined by Vario EL cube. Combustion of the sample weighed out in the CHN machine at about 1150° C. in the presence of oxidation catalysts and oxygen, aliquoting of the combustion gases, absorption of the disruptive components and detection of $N_2$ by thermal conductivity measurement cell (TCD).

The determination of the microstructure and the termonomer content of the individual polymers was effected by means of $^1H$ NMR (instrument: Bruker DPX400 with TopSpin 1.3 software, measurement frequency 400 MHz, solvent 1,1,2,2-tetrachloroethane-d2).

Crosslinking density was determined with a moving die rheometer (MDR 2000E), measuring at an angle of 0.5° and an oscillation frequency of 1.7 Hz at 160° C. for 30 minutes.

For the tensile testing, 2 mm sheets were produced by vulcanization of the vulcanizable mixture at 180° C. The dumbbell-shaped test specimens were punched out of these sheets and tensile strength and elongation were determined to ASTM D2240-81.

Hardness was determined with a durometer to ASTM D2240-81.

The glass transition temperature was obtained with the aid of a DSC measurement according to ASTM E 1356-03 or according to DIN 11357-2. For this purpose, between 10 mg and 15 mg of the sample were weighed into an aluminium boat and sealed. The boat was heated twice from −150° C. to 150° C. at a heating rate of 20 K/min in a DSC instrument from TA Instruments. The glass transition temperature was determined from the second heating curve by the standard mean value method.

TR 10 measurement: The TR measurement was conducted in accordance with ISO 2921, 2005. For this purpose, the sample was stored at −70° C. in silicone oil for 10 minutes. Subsequently, the curve was recorded at 1° C./min and the temperature for a 10% change was read off.

Swelling: To determine swelling, dumbbell-shaped test specimens as used for tensile testing were stored according to DIN ISO 1817 in IRM903 or Fuel C at 100° C. for 72 h or 168 h. Thereafter, the samples were measured and weighed, and the volume swelling and increase in mass were determined. Subsequently, tensile strength and elongation were determined to ASTM D2240-81.

The abbreviations given in the tables below have the following meanings:

"RT" room temperature (23±2° C.)
"S min" is the minimum torque of the crosslinking isotherm
"S max" is the maximum torque of the crosslinking isotherm
"delta S" is "S max-S min"
"TS1" is the time by which the Mooney viscosity has increased by one unit after the Mooney viscosity minimum has been attained, compared to the starting point
"T52" is the time by which the Mooney viscosity has increased by two units after the Mooney viscosity minimum has been attained, compared to the starting point
"t 50" is the time when 50% of S max has been attained
"t 90" is the time when 90% of S max has been attained
"t 95" is the time when 95% of S max has been attained
"M 10" modulus at 10% elongation, measured at RT
"M 25" modulus at 25% elongation, measured at RT
"M 50" modulus at 50% elongation, measured at RT
"M 100" modulus at 100% elongation, measured at RT
"M 300" modulus at 300% elongation, measured at RT
"EB" elongation at break, measured at RT
"TS" tensile strength, measured at RT
"H" hardness, measured at RT The Following Substances were Used in the Examples:

The following chemicals were purchased as commercial products from the companies specified in each case or originate from production plants of the companies specified. For the Polymerization:

| | |
|---|---|
| ACN | acrylonitrile, CAS 107-13-1 |
| BD | 1,3-butadiene, CAS 106-99-0 |
| BA | butyl acrylate, CAS 141-32-2 |
| PEG-2-MA | butoxy diethylene glycol methacrylate (BDGMA), CAS 7328-22-5 |
| Sodium dodecylsulfate (SDS) | CAS 151-21-3 |
| Na salt of disproportionated resin acid | CAS 61790-51-0 |
| Fatty acid | CAS 67701-08-8 |
| $Na_2CO_3$ | CAS 24551-51-7 |
| t-DDM | tertiary dodecyl mercaptan; LANXESS Deutschland GmbH |
| Glidox ® 500 | pinane hydroperoxide; Renessenz |
| "Premix solution Fe(II)$SO_4$" | contains 0.986 g of Fe(II)$SO_4$*7 $H_2O$ and 2.0 g of Rongalit ® C in 400 g of water |
| Rongalit C ® | sodium salt of a sulfinic acid derivative; commercial product from BASF |
| Diethylhydroxylamine | CAS 3710-84-7 |
| Vulkanox ® BKF | 2,2'-methylenebis(4-methyl-6-tert-butyl-phenol); LANXESS Deutschland GmbH |

Substances Used in the Vulcanizable Composition:

| | |
|---|---|
| NBR 5 | PERBUNAN ® 2255VP, 22.1% by weight of ACN; Mooney viscosity 55 Mu |
| NBR 6 | PERBUNAN ® 2845 F, 28.2% by weight of ACN; Mooney viscosity 43 Mu |
| NBR 7 | PERBUNAN ® 3445 F, 34.2% by weight of ACN; Mooney viscosity 43 Mu |
| Corax ® N550/30 | carbon black; Orion Engineered Carbons |
| REGAL ® SRF/N772 | carbon black; Cabot |
| VULKANOL ® OT | 2-[2-(butoxyethoxy)ethoxy]ethanol with 2,2'-thiobis(ethanol) (LANXESS) |
| EDENOR ® C18-98 MY | stearic acid (Oleo Solutions Ltd.) |
| VULKANOX ® HS/LG | 2,2,4-trimethyl-1,2-dihydroquinoline (LANXESS) |
| VULKANOX ® MB2/MG | 4/5-methyl-2-mercaptobenzimidazole (LANXESS) |
| RHENOCURE ® 90-20 | insoluble/soluble sulfur in a 90:10 ratio plus 20% mineral oil (LANXESS) |
| ZINKOXYD AKTIV | ZnO (LANXESS) |
| VULKACIT ® NZ/EGC | N-tert-butylbenzothiazylsulfenamide (TBBS) (LANXESS) |
| VULKACIT ® THIURAM/C | tetramethylthiuram disulfide (LANXESS) |
| VULKALENT ® E/C | N-phenyl-N-(trichloromethylsulfenyl)benzenesulfonamide (LANXESS) |
| Stabilizer | mixture of 2,2'-methylenebis(4-methyl-6-nonyl)phenol (CAS 7786-17-6) and styrenized diphenylamine (CAS 68442-68-2) |

I Preparation of the Unhydrogenated Nitrile-Diene-Carboxylic Ester Copolymers (NBR-Carboxylic Esters 1-4)

NBR-carboxylic ester copolymers 1 to 4 as used in the example series which follow were prepared according to the base formulation specified in Table 1, wherein all feedstocks are specified in % by weight based on 100% by weight of the monomer mixture. Table 1 also gives the particular polymerization conditions (temperature, conversion and time).

TABLE 1

Preparation of the unhydrogenated nitrile-diene-carboxylic ester copolymers (NBR 1-4; inventive examples are identified by an asterisk *).

| NBR-carboxylic ester | 1 | 2* | 3 | 4 |
|---|---|---|---|---|
| Monomers | | | | |
| Acrylonitrile (ACN) | 18 | 27 | 16 | 21 |
| 1,3-Butadiene (BD) | 31 | 46 | 32 | 24 |
| Butoxy diethylene glycol methacrylate (PEG-2-MA) | 51 | 27 | | |
| Butyl acrylate (BA) | | | 52 | 55 |
| Total amount of water | 190 | 190 | 190 | 190 |
| SDS | 2.4 | 2.4 | 1.44 | 1.44 |
| Na salt of disproportionated resin acid | 0.5 | 0.5 | 0.4 | 0.4 |
| $Na_2CO_3$ | 0.12 | 0.12 | 0.12 | 0.12 |
| pH | 10.5 ± 0.5 | 10.5 ± 0.5 | 10.5 ± 0.5 | 10.5 ± 0.5 |
| t-DDM | 0.25 | 0.30 | 0.29 | 0.29 |
| Glidox ® 500 | 0.02 | 0.02 | 0.02 | 0.02 |
| Premix solution $FeSO_4$ | 0.03 | 0.02 | 0.03 | 0.03 |
| Diethylhydroxylamine | 0.2 | 0.2 | 0.2 | 0.2 |
| stabilizer | | | 0.5 | 0.5 |
| Polymerization conditions | | | | |
| Polymerization temperature [° C.] | 12 | 12 | 12 | 12 |
| Polymerization conversion [%] | 71.5 | 72.2 | 68.4 | 71.1 |
| Polymerization time [h] | 5 | 7 | 6.5 | 7 |

TABLE 2

Addition of the increments of the nitrile-diene-carboxylic ester copolymers (NBR 1-4)
The increments of the monomers were added at the reported monomer conversions ±5%.

| | NBR | | | |
|---|---|---|---|---|
| | 1 | 2 | 3* | 4* |
| Conversion [%] | ACN (a)/BD (b) [% by wt.] | | | |
| 21 | 3/6 | —/— | —/— | 3.5/6 |
| 33 | —/— | 9/— | —/— | —/— |
| 42 | 3/7 | —/— | 3/6 | 2.5/3 |

TABLE 2-continued

Addition of the increments of the nitrile-diene-carboxylic ester copolymers (NBR 1-4)
The increments of the monomers were added at the reported monomer conversions ±5%.

| Conversion [%] | NBR | | | |
|---|---|---|---|---|
| | 1 | 2 | 3* | 4* |
| | ACN (a)/BD (b) [% by wt.] | | | |
| 48 | 3/6 | —/— | —/— | —/— |
| 63 | —/— | —/— | 2/4 | 2.5/3 |

*Conversion at 27%

The nitrile-diene-carboxylic ester copolymers were prepared batchwise in a 5 l autoclave with stirrer system. In each of the autoclave batches, 1.25 kg of the monomer mixture and a total amount of water of 2.1 kg were used, as was EDTA in an equimolar amount based on the Fe(II). 1.9 kg of this amount of water were initially charged with the emulsifier in the autoclave and purged with a nitrogen stream. Thereafter, the destabilized monomers and the amount of the t-DDM molecular weight regulator specified in the table were added and the reactor was closed. After the reactor contents had been brought to temperature, the polymerizations were initiated by the addition of the premix solutions and the hydroperoxide.

The progression of the polymerization was monitored by gravimetric conversion determinations. Upon attainment of the conversions reported in Table 1 the polymerization was terminated by adding an aqueous solution of diethylhydroxylamine. Unconverted monomers and other volatile constituents were removed by means of steam distillation.

Before the respective NBR latex coagulated, it was admixed in each case with a 45% dispersion of Vulkanox® BKF (0.1% by weight of Vulkanox® BKF based on NBR solids) or of the stabilizer mixture (2,2'-methylenebis(4-methyl-6-nonyl)phenol (CAS 7786-17-6) and styrenized diphenylamine (CAS 68442-68-2), 0.5% by weight based on NBR solids). This was followed by coagulation with $CaCl_2$), washing and drying of the crumbs obtained.

The dried NBR rubbers were characterized by Mooney viscosity, ACN content and glass transition temperature and the content of termonomers was determined by $^1$H-NMR analysis (Table 3).

TABLE 3

Composition and properties of the unhydrogenated nitrile-diene-carboxylic ester copolymers 1 to 4 and the commercially available nitrile-diene rubbers 5 to 7 (amounts of copolymerized monomer in % by weight; inventive examples identified by an asterisk *)

| NBR | | 1 | 2* | 3 | 4 | 5 | 6 | 7 |
|---|---|---|---|---|---|---|---|---|
| ACN (a) | [% by wt.] | 15 | 25 | 16 | 19 | 22 | 28 | 34 |
| BD (b) | [% by wt.] | 34 | 51 | 45 | 52 | 78 | 72 | 66 |
| PEG-2-MA (c) | [% by wt.] | 51 | 24 | | | | | |
| BA | [% by wt.] | | | 39 | 29 | | | |
| Mooney viscosity ML(1 + 4@100° C.) | MU | 17 | 17 | 29 | 39 | 55 | 43 | 43 |

II Production of Vulcanizates of the Nitrile-Diene-Carboxylic Ester Copolymers (NBR V1 to V7):

Production of the Vulcanizable Compositions:

All the rubber mixtures were produced on a mixing roll mill. The diameter of the rolls was 80 mm, the length 200 mm. The rolls were preheated to 30° C.; the speed of the front roll was 16.5 rpm, that of the rear roll 20 rpm, which achieved a friction of 1:1.2.

The rubber was initially charged and mixed for one (1) minute until a smooth milled sheet had formed. Subsequently, first the carbon black, then the additives and finally the crosslinking chemicals were incorporated. The total mixing time was 10 to 12 minutes.

TABLE 4

Composition of the vulcanizable compositions (V1 to V7; inventive examples are identified by an asterisk *)

| Example | V1 | V2* | V3 | V4 | V5 | V6 | V7 |
|---|---|---|---|---|---|---|---|
| NBR copolymer composition | % by wt. | % by wt. | % by wt. | % by wt. | % by wt. | % by wt. | % by wt. |
| ACN (a) | 15 | 25 | 16 | 19 | 22 | 28 | 34 |
| BD (b) | 34 | 51 | 45 | 52 | 78 | 72 | 66 |
| PEG-2-MA (c) | 51 | 24 | | | | | |
| BA (d) | | | 39 | 29 | | | |
| NBR copolymer | parts | parts | parts | parts | parts | parts | parts |
| NBR 1* | 100 | | | | | | |
| NBR 2* | | 100 | | | | | |
| NBR 3 | | | 100 | | | | |
| NBR 4 | | | | 100 | | | |
| NBR 5 | | | | | 100 | | |
| NBR 6 | | | | | | 100 | |
| NBR 7 | | | | | | | |
| NBR 8 | | | | | | | 100 |
| Other components | phr | phr | phr | phr | phr | phr | phr |
| Corax ® N 550/30 | 30 | 30 | 30 | 30 | 30 | 30 | 30 |
| Regal ® SRF/N772 | 50 | 50 | 50 | 50 | 50 | 50 | 50 |
| Vulkanol ® OT | 10 | 10 | 10 | 10 | 10 | 10 | 10 |
| Edenor ® C18-98 MY | 0.3 | 0.3 | 0.3 | 0.3 | 0.3 | 0.3 | 0.3 |
| Vulkanox ® HS/LG | 1.5 | 1.5 | 1.5 | 1.5 | 1.5 | 1.5 | 1.5 |
| Vulkanox ® MB2/MG | 1.5 | 1.5 | 1.5 | 1.5 | 1.5 | 1.5 | 1.5 |
| Rhenocure ® IS 90-20 | 0.37 | 0.37 | 0.37 | 0.37 | 0.37 | 0.37 | 0.37 |

TABLE 4-continued

Composition of the vulcanizable compositions (V1 to V7; inventive examples are identified by an asterisk *)

| Example | V1 | V2* | V3 | V4 | V5 | V6 | V7 |
|---|---|---|---|---|---|---|---|
| Zinkoxyd Aktiv | 5 | 5 | 5 | 5 | 5 | 5 | 5 |
| Vulkacit ® NZ/EGC | 1.5 | 1.5 | 1.5 | 1.5 | 1.5 | 1.5 | 1.5 |
| Vulkacit ® Thiuram/C | 2 | 2 | 2 | 2 | 2 | 2 | 2 |
| Vulkalent ® E/C | 1 | 1 | 1 | 1 | 1 | 1 | 1 |

TABLE 5

Crosslinking density of vulcanizates V1 to V7

| MDR at 160° C. | Unit | V1 | V2* | V3 | V4 | V5 | V6 | V7 |
|---|---|---|---|---|---|---|---|---|
| S min | dNm | 0.8 | 1.5 | 1.1 | 1.1 | 2.5 | 1.4 | 1.2 |
| S max | dNm | 12.7 | 17.4 | 18.7 | 16.6 | 22.1 | 21.7 | 21.5 |
| TS 1 | min | 2.1 | 1.6 | 2.0 | 2.0 | 1.5 | 1.5 | 1.4 |
| TS 2 | min | 2.3 | 1.9 | 2.3 | 2.3 | 1.7 | 1.7 | 1.5 |
| t 10 | min | 2.1 | 1.8 | 2.2 | 2.2 | 1.7 | 1.7 | 1.5 |
| t 25 | min | 2.5 | 2.1 | 2.7 | 2.7 | 2.0 | 2.0 | 1.8 |
| t 50 | min | 3.0 | 2.6 | 3.3 | 3.5 | 2.4 | 2.5 | 2.2 |
| t 70 | min | 3.6 | 3.1 | 4.0 | 4.3 | 2.8 | 3.0 | 2.7 |
| t 80 | min | 4.1 | 3.5 | 4.8 | 5.1 | 3.1 | 3.4 | 3.1 |
| t 90 | min | 4.8 | 4.2 | 6.5 | 7.0 | 3.8 | 4.2 | 3.8 |
| t 95 | min | 5.4 | 5.3 | 8.7 | 9.7 | 4.7 | 5.2 | 5.3 |

The crosslinking properties of the inventive vulcanizate V2 are comparable to butyl acrylate-containing NBR copolymers (V3 and V4) and the commercially available NBR copolymers (V5 to V7).

The mouldings (sheets of thickness 2 mm) for the performance of the further determinations were produced by vulcanization at 160° C. for 15 minutes.

TABLE 6

Physical properties of the unaged vulcanizates V1 to V7

| | | V1 | V2* | V3 | V4 | V5 | V6 | V7 |
|---|---|---|---|---|---|---|---|---|
| Tensile test | | | | | | | | |
| TS | MPa | 8.3 | 11.2 | 10.2 | 13.1 | 15.4 | 14.4 | 15.1 |
| EB | % | 210 | 232 | 226 | 250 | 297 | 317 | 340 |
| M50 | MPa | 1.4 | 1.8 | 1.8 | 1.9 | 2 | 2.1 | 2.1 |
| M100 | MPa | 3.7 | 4.2 | 4.2 | 4.8 | 4.1 | 4.2 | 4.1 |
| Hardness | Shore A | 58.1 | 63.5 | 64.8 | 62.5 | 68.3 | 69.4 | 69.7 |
| Glass transition temperature | | | | | | | | |
| TR 10 | ° C. | −48.7 | −41.8 | −39.2 | −31.1 | −40.8 | −32.8 | −27 |
| TR 30 | ° C. | −43.2 | −37 | −35.3 | −26.7 | −36 | −28.9 | −23.4 |
| TR 50 | ° C. | −38.7 | −32.8 | −31.9 | −23.3 | −31.2 | −25 | −20 |
| TR 70 | ° C. | −33.1 | −27.2 | −27.2 | −19.1 | −23.8 | −19.2 | −14.9 |
| TR 70 − TR 10 | ° C. | 15.5 | 14.6 | 12 | 11.9 | 17 | 13.6 | 12.1 |
| DSC Tg | ° C. | −57.5 | −48.5 | −44.5 | −37.3 | −50.0 | −38.4 | −31.3 |

The comparison of V1 with V2* and V5 with V6 and V7 shows that the Tg of the vulcanizate falls with a reduced content of ACN.

In the comparison of V2 with V5, it can be seen that the exchange of BD for BDGMA, with about the same amount of ACN, leads to comparable TR10 and DSC values.

V1 has a lower Tg than the inventive vulcanizate V2.

TABLE 7

Physical properties of the vulcanizates V1 to V7 after storage in IRM 903 at 100° C. for 3 days

| Ageing properties | Unit | V1 | V2* | V3 | V4 | V5 | V6 | V7 |
|---|---|---|---|---|---|---|---|---|
| TS | MPa | 8.5 | 14.2 | 11.5 | 13.8 | 15.5 | 15.3 | 17.2 |
| EB | % | 166 | 234 | 219 | 213 | 273 | 285 | 324 |
| M50 | MPa | 1.7 | 2.2 | 1.9 | 2.1 | 1.8 | 2.1 | 2.4 |
| M100 | MPa | 4.7 | 5.4 | 4.8 | 5.8 | 4.3 | 4.6 | 5 |
| Hardness | Shore A | 60 | 67.2 | 60 | 63.7 | 60.2 | 66.1 | 70.9 |
| Δ TS | % | 2.4 | 26.8 | 12.7 | 5.3 | 0.6 | 6.3 | 13.9 |
| Δ EB | % | −21.0 | 0.9 | −3.1 | −14.8 | −8.1 | −10.1 | −4.7 |
| Δ M50 | % | 21.4 | 22.2 | 5.6 | 10.5 | −10.0 | 0.0 | 14.3 |
| Δ M100 | % | 27.0 | 28.6 | 14.3 | 20.8 | 4.9 | 9.5 | 22.0 |
| Δ hardness | Shore A | 1.9 | 3.7 | −4.8 | 1.2 | −8.1 | −3.3 | 1.2 |
| Δ volume | % | 2.4 | −0.2 | 11.9 | 4.9 | 18.3 | 8.1 | 2.4 |
| Δ weight | % | 1.0 | −1.0 | 8.2 | 2.9 | 13.1 | 5.7 | 1.3 |

The inventive nitrile-diene-carboxylic ester copolymer vulcanizate V2 has reduced swelling (increase in volume) after ageing in IRM 903 for three days, compared to the comparative vulcanizate V1 or the copolymers V5 and V6 with a similar content of acrylonitrile monomers of 22% to 28% by weight.

The inventive vulcanizate V2 with BDGMA as termonomer has both a low glass transition temperature (TR 10 or DSC Tg) of less than −40° C. and simultaneously low swelling in oil.

TABLE 8

Physical properties of the vulcanizates V1 to V7 after storage in IRM 903 at 100° C. for 7 days

| Ageing properties | Unit | V1 | V2* | V3 | V4 | V5 | V6 | V7 |
|---|---|---|---|---|---|---|---|---|
| TS | MPa | 10.2 | 13.3 | 12 | 14.8 | 15.8 | 14.8 | 17 |
| EB | % | 190 | 208 | 214 | 223 | 260 | 255 | 270 |
| M50 | MPa | 1.9 | 2.3 | 1.9 | 2.3 | 1.8 | 2.2 | 2.7 |
| M100 | MPa | 4.9 | 5.6 | 5 | 6.1 | 4.4 | 4.9 | 5.6 |
| Hardness | Shore A | 63.5 | 69.9 | 61.8 | 65.7 | 60.4 | 67.7 | 72.6 |
| ΔTS | % | 22.9 | 18.8 | 17.6 | 13.0 | 2.6 | 2.8 | 12.6 |
| Δ EB | % | −9.5 | −10.3 | −5.3 | −10.8 | −12.5 | −19.6 | −20.6 |
| Δ M50 | % | 35.7 | 27.8 | 5.6 | 21.1 | −10.0 | 4.8 | 28.6 |
| Δ M100 | % | 32.4 | 33.3 | 19.0 | 27.1 | 7.3 | 16.7 | 36.6 |
| Δ hardness | Shore A | 5.4 | 6.4 | −3 | 3.2 | −7.9 | −1.7 | 2.9 |
| Δ volume | % | 3.4 | 0.6 | 13.3 | 5.9 | 18.9 | 8.6 | 3.7 |
| Δ weight | % | 0.1 | −1.7 | 7.8 | 2.2 | 12.1 | 4.8 | 0.8 |

The inventive vulcanizate V2 has reduced swelling (increase in volume) after ageing in IRM 903 for 7 days, compared to the comparative vulcanizate V1 or the comparative vulcanizates V5 and V6 with a similar content of acrylonitrile monomers of 22% to 28% by weight.

TABLE 9

Properties of the vulcanizates before and after ageing in Fuel C at 23° C. for 3 days

| Ageing properties | | V1 | V2* | V3 | V4 | V5 | V6 | V7 |
|---|---|---|---|---|---|---|---|---|
| TS | MPa | 3.8 | 5.8 | 4.3 | 5.6 | 4.7 | 6.8 | 7.1 |
| EB | % | 88 | 118 | 89 | 102 | 96 | 147 | 157 |
| M50 | MPa | 1.6 | 1.7 | 2 | 1.9 | 1.9 | 1.7 | 1.6 |
| M100 | MPa | | 4.7 | | 5.4 | 5.1 | 4.2 | 4 |
| Hardness | Shore A | 45 | 51.5 | 49.7 | 49.8 | 49.6 | 52.2 | 54.6 |
| Δ TS | % | −54.2 | −48.2 | −57.8 | −57.3 | −69.5 | −52.8 | −53.0 |
| Δ EB | % | −58.1 | −49.1 | −60.6 | −59.2 | −67.7 | −53.6 | −53.8 |
| Δ M50 | % | 14.3 | −5.6 | 11.1 | 0.0 | −5.0 | −19.0 | −23.8 |
| Δ M100 | % | | 11.9 | | 12.5 | 24.4 | 0.0 | −2.4 |
| Δ hardness | Shore A | −13.1 | −12 | −15.1 | −12.7 | −18.7 | −17.2 | −15.1 |
| Δ volume | % | 64.8 | 45.3 | 81.2 | 62.8 | 79.2 | 54.9 | 40.6 |
| Δ weight | % | 39.3 | 28.0 | 51.5 | 39.0 | 51.3 | 35.8 | 26.4 |

The inventive vulcanizate V2* likewise has reduced swelling after ageing in Fuel C for 3 days, compared to the comparative vulcanizate V1 or the comparative vulcanizates V5 and V6 with a similar content of acrylonitrile monomers of 22% to 28% by weight.

Vulcanizates V3 and V4 containing terpolymers based on butyl acrylate (BA) are incapable of simultaneously having a low glass transition temperature and a small change in swelling on ageing like the inventive vulcanizate V2*.

The comparison of V1 with V3, both of which have a similar amount of acrylonitrile monomers, shows that the exchange of the butyl acrylate termonomers in V3 for the PEG-2-MA (BDGMA) causes a distinct reduction in change in volume (swelling).

The swelling properties of the inventive terpolymer V2 are similar to those of copolymer V7 which, however, contains much more acrylonitrile (namely 34% by weight compared to only 25% by weight in V2). By comparison with V7, however, the glass transition temperature of the inventive vulcanizate V2* is much lower.

The comparison of V1 with V2* makes it clear that vulcanizates solely based on terpolymers with small amounts of nitrile monomer units are insufficient to simultaneously also achieve particularly low swelling.

The mechanical properties of the inventive vulcanizate V2* have essentially not deteriorated by comparison with the vulcanizate based on the commercially available copolymers V5 to V7.

The particular advantage of the invention is that vulcanizates based on the nitrile-diene-carboxylic ester copolymers according to the invention have low swelling and simultaneously good cold flexibility.

In terms of the combination of these properties, the nitrile-diene-carboxylic ester copolymers according to the invention are superior to nitrile-diene-carboxylic ester copolymers that are commercially available to date or known from the prior art.

The invention claimed is:

1. Unhydrogenated nitrile-diene-carboxylic ester copolymers comprising:
  (a) 15% to 40% by weight of at least one α,β-ethylenically unsaturated nitrile unit,
  (b) 30% to 65% by weight of at least one conjugated diene unit and
  (c) 20% to 30% by weight of at least one PEG acrylate unit (c), the PEG acrylate unit (c) is butoxy polyethylene glycol (meth)acrylate having 2 repeat ethylene glycol units.

2. Unhydrogenated nitrile-diene-carboxylic ester copolymers according to claim 1, wherein the α,β-ethylenically unsaturated nitrile units (a) are derived from acrylonitrile, methacrylonitrile, ethacrylonitrile, or mixtures thereof.

3. Unhydrogenated nitrile-diene-carboxylic ester copolymers according to claim 1, wherein the conjugated diene units (b) are derived from 1,3-butadiene, isoprene, 2,3-dimethylbutadiene, 1,3-pentadiene (piperylene), or mixtures thereof.

4. Unhydrogenated nitrile-diene-carboxylic ester copolymers according to claim 1, wherein copolymers are those containing 15% to 40% by weight of acrylonitrile units, 30% to 65% by weight of 1,3-butadiene units and 20% to 30% by weight of butoxy diethylene glycol (meth)acrylate units.

5. Vulcanizable composition comprising unhydrogenated nitrile-diene-carboxylic ester copolymers according to claim 1 and at least one crosslinker.

6. Process for producing a vulcanizable composition comprising mixing a unhydrogenated nitrile-diene-carboxylic ester copolymer according to claim 1 with at least one crosslinker.

7. Process for producing a vulcanizate based on unhydrogenated nitrile-diene-carboxylic ester copolymers, said process comprising subjecting the vulcanizable composition according to claim 5 to a vulcanization, optionally in a shaping process and optionally at a temperature in the range from 100° C. to 250° C.

8. Vulcanizate obtained by the process according to claim 7.

9. Vulcanizate according to claim 8, which is a molding selected from belts, gaskets and gasket profiles, rollers, membranes, footwear components, hoses, damping elements, insulating materials, stators and cable sheaths.

* * * * *